(12) United States Patent
Morita et al.

(10) Patent No.: US 7,777,456 B2
(45) Date of Patent: Aug. 17, 2010

(54) ELECTRIC STORAGE DEVICE

(75) Inventors: Kazuki Morita, Osaka (JP); Yoshimitu Odajima, Osaka (JP); Junji Takemoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 435 days.

(21) Appl. No.: 11/918,252

(22) PCT Filed: May 15, 2006

(86) PCT No.: PCT/JP2006/309631

§ 371 (c)(1),
(2), (4) Date: Oct. 11, 2007

(87) PCT Pub. No.: WO2006/123598

PCT Pub. Date: Nov. 23, 2006

(65) Prior Publication Data

US 2009/0072791 A1   Mar. 19, 2009

(30) Foreign Application Priority Data

May 16, 2005   (JP) .............................. 2005-142640

(51) Int. Cl.
*H02J 7/00* (2006.01)
*H02M 3/06* (2006.01)
*H02M 3/18* (2006.01)
*H02M 1/00* (2007.01)

(52) U.S. Cl. ..................... 320/166; 307/109; 307/110; 363/149

(58) Field of Classification Search .................. 320/166
See application file for complete search history.

(56) References Cited

U.S. PATENT DOCUMENTS

| 5,545,933 | A | | 8/1996 | Okamura et al. |
| 6,140,928 | A | * | 10/2000 | Shibuya et al. ......... 340/636.13 |
| 6,420,852 | B1 | * | 7/2002 | Sato ........................... 320/134 |
| 6,437,540 | B2 | * | 8/2002 | Sonobe ....................... 320/134 |
| 7,624,292 | B2 | * | 11/2009 | Nishida ....................... 713/340 |

FOREIGN PATENT DOCUMENTS

| CN | 2613916 Y | 4/2004 |
| JP | 63-110926 | 5/1988 |
| JP | 5-219663 | 8/1993 |
| JP | 7-099723 | 4/1995 |
| JP | 7-288938 | 10/1995 |
| JP | 2000-197277 | 7/2000 |

* cited by examiner

*Primary Examiner*—Edward Tso
*Assistant Examiner*—Yalkew Fantu
(74) *Attorney, Agent, or Firm*—McDermott Will & Emery LLP (57) ABSTRACT

Electric storage device is provided which is capable of smoothly charging storage elements and reliably detecting an overvoltage of each of the storage elements. Electric storage device includes charging/discharging limiting circuit. Charging/discharging limiting circuit includes charge element, discharge, control unit, charging current detection unit, voltage detection unit, valuable reference voltage source, and voltage comparison unit. A magnitude of valuable reference voltage source that is connected to an input terminal on a first side of voltage comparison unit is adjusted by charging current detection unit. Detection signal from the voltage detection unit is given to an input terminal on a second side of voltage comparison unit.

13 Claims, 9 Drawing Sheets

PRIOR ART

ELECTRIC STORAGE DEVICE

RELATED APPLICATIONS

This application is the U.S. National Phase under 35 U.S.C. §371 of International Application No. PCT/JP2006/309631, filed on May 15, 2006, which in turn claims the benefit of Japanese Application No. 2005-142640, filed on May 16, 2005, the disclosures of which Applications are incorporated by reference herein

TECHNICAL FIELD

The present invention relates to an electric storage device, configured by connecting a plurality of storage elements in serial or in series parallel, and having a charging/discharging limiting circuit function of detecting an overvoltage of the storage elements to prevent a deterioration of the storage elements.

BACKGROUND ART

In a case where electric double-layer capacitors as storage elements are serially connected and then used, conventionally, a life of each storage elements has a large influence on a voltage applied to each storage element. Therefore, when variations in charging voltage of the storage elements occur, a reliability of the life as a whole of the electric storage devices may be degraded, and hence the voltage of each storage element is constantly monitored.

Figure 9:
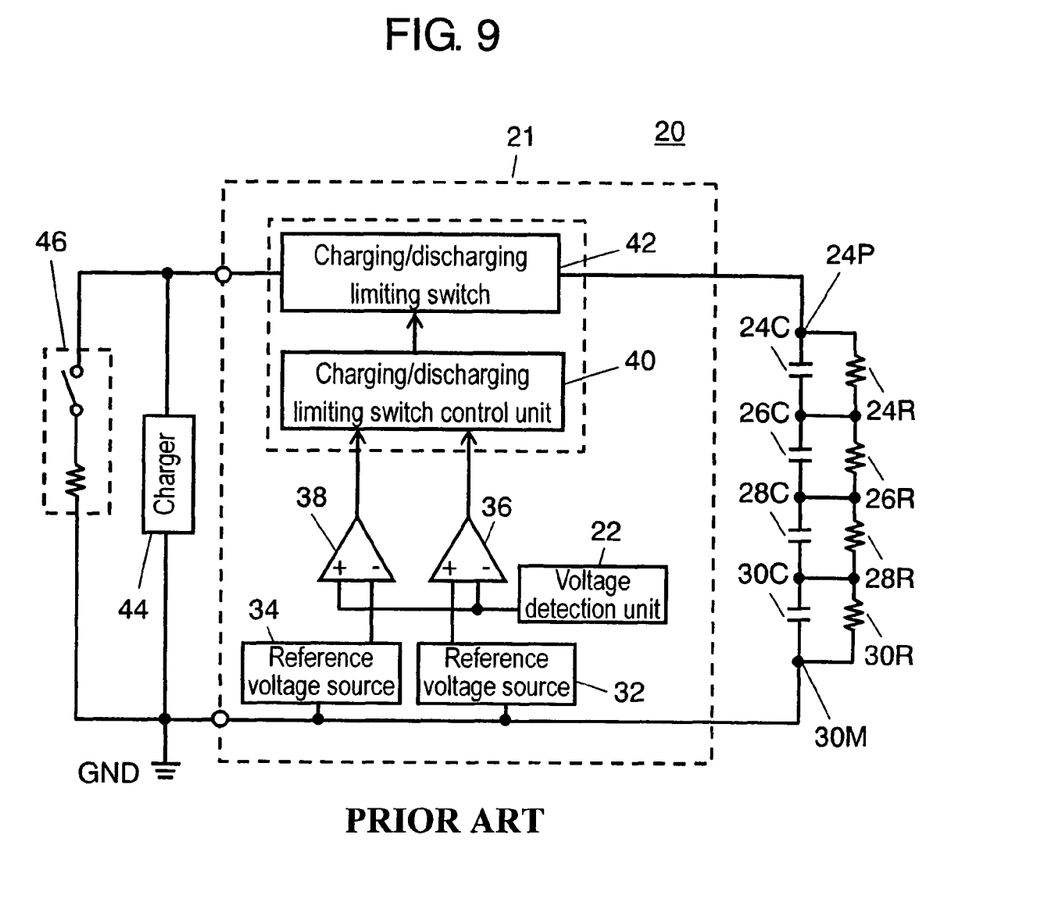
FIG. 9 is a constitutional view of a conventional electric storage device.

FIG. 9 shows a configuration of conventional electric storage device 20. Electric storage device 20 includes charging/discharging limiting circuit 21. Charging/discharging limiting circuit 21 includes voltage detection unit 22, reference voltage sources 32 and 34, voltage comparison units 36 and 38, charging/discharging limiting switch control unit 40, and charging/discharging limiting switch 42.

Voltage detection unit 22 is provided so as to detect a voltage between plus-side terminal 24P of storage element 24C and minus-side terminal 30M of storage element 30C, the storage elements being connected in a plurality of serial stages. When storage elements 24C, 26C, 28C and 30C are over-charged, the inter-terminal voltages increase themselves, resulting in an increase in voltage of the storage elements as a whole which is generated between plus-side terminal 24P and minus-side terminal 30M. It is to be noted that balance resistances 24R, 26R, 28R and 30R are contacted in parallel with storage elements 24C, 26C, 38C and 30C, respectively.

When these storage elements are over-discharged, the inter-terminal voltages of the storage elements decrease, and the voltage of the storage elements as a whole which is generated between plus-side terminal 24P and minus-side terminal 30M also decreases.

Further, the device is configured such that a lower-limit voltage and an upper-limit voltage, which are allowed during discharging and charging, are set in reference voltage sources 32 and 34 and compared in voltage comparison units 36 and 38 with a detection voltage detected by voltage detection unit 22, and the detection results are separately outputted to charging/discharging limiting switch control unit 40.

Here, the device is configured such that, when the detection voltage detected by voltage detection unit 22 falls below reference voltage source 32, discharging from the storage element is limited through charging/discharging limiting switch 42. When the detection voltage exceeds reference voltage source 34, charging to the storage element is limited through charging/discharging limiting switch 42. It is to be noted that charging is performed by charger 44 and discharging is performed by external load 46.

Moreover, as a prior art document relating to the invention of this application, for example, Unexamined Japanese Patent Publication No. 2000-197277 is known.

However, in a conventional configuration, in a case where an internal resistances (not shown) of storage elements 24C, 26C, 28C and 30C increase, or in a low temperature atmosphere such that an ambient temperature of where the storage elements are placed is not higher than 0° C. assuming that the internal resistance of one storage element among the plurality of storage elements becomes extremely large as compared with the other storage elements, an extra voltage generated by a product of the internal resistance of the storage element and a charging current is applied to the storage element in addition to a voltage obtained by voltage division according to an inverse ratio of the capacity. Therefore, the inter-terminal voltage of the storage elements soon reaches a magnitude of reference voltage source 34, and every time that occurs, the charging current is limited, which causes a problem of taking time for charging.

In order to eliminate such a problem, for example in the low temperature atmosphere not higher than 0° C., it is necessary to take measures such as measuring electric characteristics of the storage elements to perform a selecting operation according to the levels of the characteristics, or increasing the number of serially connected storage elements for securing a resistance voltage. However, it is impossible to say that such measures are the optimum methods since causing a cost increase. Further, the larger the charging current, the more significantly such a tendency appears in the low temperature atmosphere, thereby bringing the electric storage device with a large current capacitance into even more disadvantageous state.

DISCLOSURE OF THE INVENTION

The present invention is to overcome such a problem, and to provide an electric storage device capable of alleviating or suppressing an influence of variations in internal resistance of the storage elements and concentration of a voltage which is transitionally generated by the charging current during charging to the storage element, to smoothly charge the storage elements, and reliably detect an overvoltage of each of the storage elements so as to prevent deterioration of the storage elements from occurring.

The electric storage device of the present invention includes: an input terminal; a direct current power source connected to the input terminal; and a charge element connected to the input terminal and limiting a direct current from the direct current power source. Further, the electric storage device includes: a charging current detection unit connected to the charge element and detecting a charging current; a storage element connected to the charging current detection unit; and a discharge element connected to the storage element. Further, the electric storage device includes: an output terminal connected to the discharge element; a voltage detection unit detecting a voltage to be applied to the storage element; and a control unit connected to the voltage detection unit and controlling the charge element and the discharge element. Further, the electric storage device includes: a voltage comparison unit connected to the voltage detection unit and the control unit; and a variable reference voltage source connected to the voltage comparison unit and its magnitude can be adjusted, and an inter-terminal voltage of the storage element can be determined by the reference voltage source.

Such an electric storage device of the present invention can eliminate an influence of variations in internal resistance of the storage elements and concentration of a voltage which is transitionally generated by the charging current during charging to the storage element, to smoothly charge the storage elements and reliably detect an overvoltage of each of the storage elements so as to prevent deterioration of the storage elements from occurring.

REFERENCE MARKS IN THE DRAWINGS 20, 100 Storage device
21, 101 Charging/discharging limiting circuit
24C, 26C, 28C, 30C, 102C, 104C, 106C Storage element
24P Plus-side terminal
30M Minus-side terminal
22 Voltage detection unit
32, 34 Reference voltage source
36, 38 Voltage comparison unit
40 Charging/discharging limiting switch control unit
42 Charging/discharging limiting switch
44 Charger
46 External load
108 Input terminal
110 Direct current power source
116 Output terminal
112 Charging element
120 Charging current detection unit
114 Discharge element
118 Control unit
126 Voltage comparison unit
124 Variable reference voltage source
122 Voltage detection unit
24R, 26R, 28R, 30R, 102R, 104R, 106R Balance resistance
130 Temperature detection unit
132 Timer circuit
134 Voltage storage unit
136 Irregular signal generation circuit
138 Irregular signal terminal
140R Discharge resistance
142 Discharge switch

PREFERRED EMBODIMENTS FOR CARRYING OUT OF THE INVENTION

In the following, embodiments of the present invention are described with reference to drawings. In FIGS. 1 to 8, constituents having an identical function are provided with an identical symbol and the description thereof will not be given.

Embodiment 1

Figure 1:
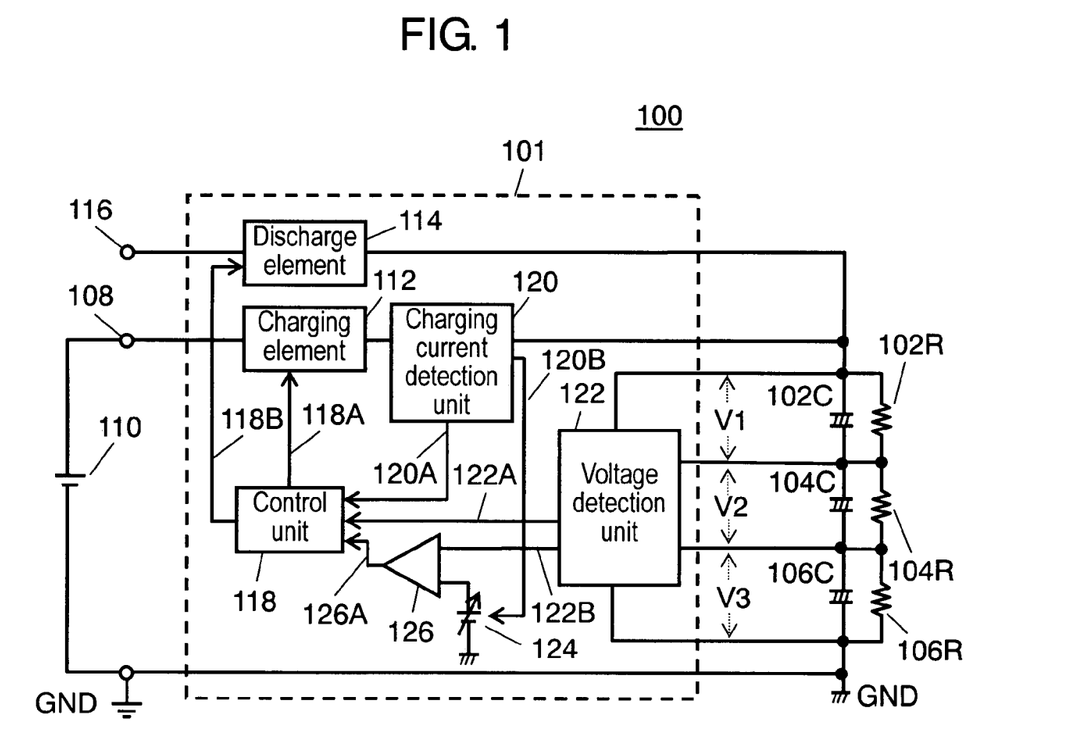
FIG. 1 is a constitutional view of an electric storage device according to an embodiment 1 of the present invention.

FIG. 1 is a constitutional view of electric storage device 100 according to an embodiment 1. Electric storage device 100 includes charging/discharging limiting circuit 101. Charging/discharging limiting circuit 101 includes charge element 112, discharge element 114, control unit 118, charging current detection unit 120, voltage detection unit 122, valuable reference voltage source 124, and voltage comparison unit 126. Here, valuable reference voltage source 124 is not in a conventional form where the magnitude of the voltage is fixed, but in a form where the magnitude of the voltage is automatically adjustable under control from some type of circuit unit.

A plurality of storage elements 102C, 104C and 106C made up of electric double-layer capacitors are connected in serial. Storage elements 102C, 104C and 106C are connected in parallel with balance resistances 102R, 104R and 106R, respectively. Input terminal 108 is connected with direct current power source 110 as a charging current source, and configured so as to charge storage elements 102C, 104C and 106C through charge element 112 that limits a charging current. Namely, storage elements 102C, 104C and 106C are charged by direct current power source 110 through charge element 112 and charging current detection unit 120.

Inter-terminal voltages V1, V2 and V3 that are generated in storage elements 102C, 104C and 106C are outputted to output terminal 116 through discharge element 114 that controls a discharging current. Charge element 112 and discharge element 114 are controlled so as to be activated based on control signal 118A and 118B outputted from control unit 118. Further, control unit 118 generates control signals 118A and 118B based on detection signal 120A, 122A and 126A. Detection signal 120A is outputted from charging current detection unit 120 that detects a charging current of storage elements 102C, 104C and 106C. Detection signal 122A is outputted from voltage detection unit 122 that detects charging voltages of storage elements 102C, 104C and 106C. Detection signal 126A is outputted from voltage comparison unit 126 that compares valuable reference voltage source 124 with the discharging voltage. Charge element 112 is controlled by means of control signal 118A, and discharge element 114 is controlled by means of control signal 118B.

Storage elements 102C, 104C and 106C are charged by a fixed charging current (constant current) in an initial stage of charging, and when charging proceeds and these storage elements reach a previously set voltage, charge element 112 is controlled based on control signal 118A so as to have a constant voltage. Further, in a case where certain irregularity occurs in storage elements 102C, 104C and 106C or in charging/discharging limiting circuit 101, valuable reference voltage source 124 is newly adjusted to have a prescribed magnitude by means of detection signal 120B taken out of charging current detection unit 120 so that the voltages that are applied to those storage elements do not exceed the resistance voltage. A comparison is made in voltage comparison unit 126 between newly adjusted valuable reference voltage source 124 and voltages corresponding to inter-terminal voltages V1, V2 and V3 of storage elements 102C, 104C and 106C.

Valuable reference voltage source 124 is connected to an input terminal on a first side of voltage comparison unit 126. Detection signal 122B taken out of voltage detection unit 122 is connected to an input terminal on a second side of voltage comparison unit 126. Detection signal 122B is determined to be almost the same as the inter-terminal voltages of storage elements 102C, 104C and 106C, or be a voltage proportional to these voltages. Valuable reference voltage source 124 is compared with a detection signal taken out of voltage detection unit 122 in voltage comparison unit 126, and the comparison detection result is taken out of the output side of voltage comparison unit 126 as detection signal 126A.

When inter-terminal voltages V1, V2 and V3 of storage elements 102C, 104C and 106C exceed valuable reference voltage source 124, charge element 112 is controlled through control unit 118 and control signal 118A to halt the charging current or limit the magnitude of the charging current. This allows more reliable prevention of deterioration of storage elements 102C, 104C and 106C.

It is to be noted that voltage detection unit 122 may detect the entire voltage of the plurality of storage elements 102C, 104C and 106C, namely the magnitude of (V1+V2+V3), or at least one of the inter-terminal voltages of storage elements 102C, 104C and 106C, namely V1, V2 and V3. Further, the plurality of storage elements 102C, 104C and 106C may be grouped, and the sum or difference of any two of inter-terminal voltages V1, V2 and V3 may be detected.

The embodiment 1 is characterized in that valuable reference voltage source 124 generates control signal 120B based on the charging current detected by charging current detection unit 120, and adjusts the magnitude of valuable reference voltage source 124 by means of control signal 120B. Such a characteristic apparently differs from that of the conventional electric storage device with a fixed reference voltage power.

Figure 2:
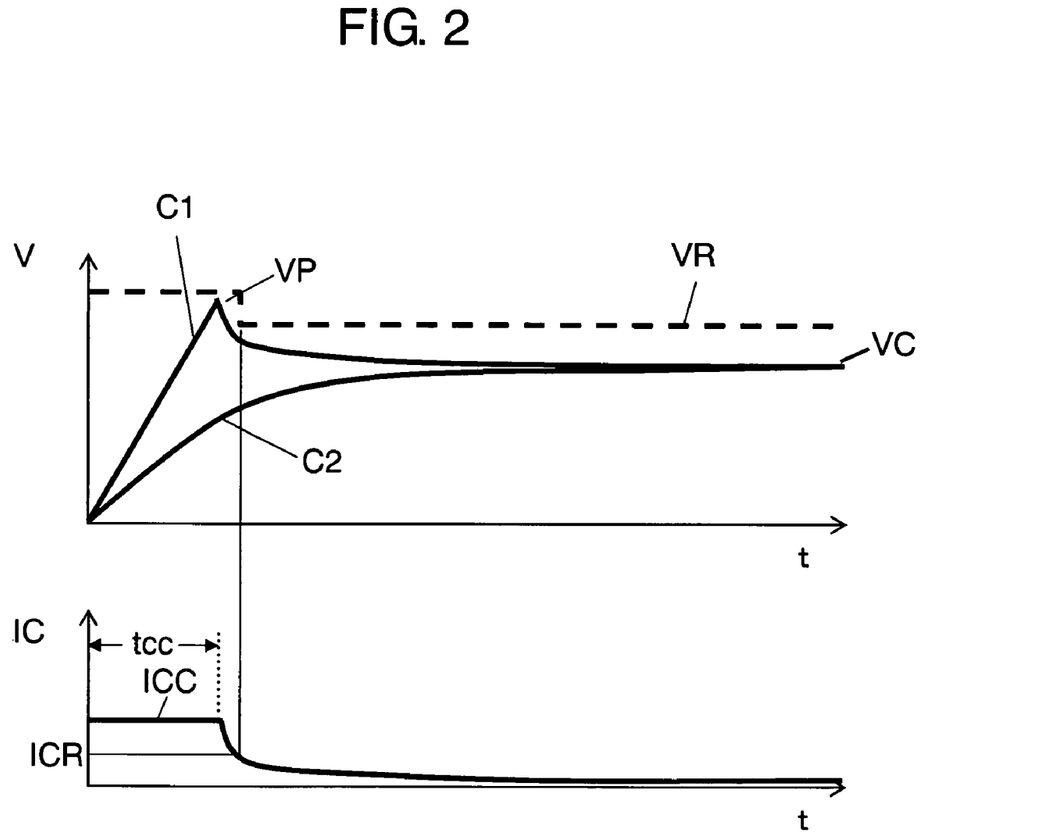
FIG. 2 is a time chart according to the embodiment 1 of the present invention.

FIG. 2 is a time chart during charging for explaining the characteristic of the electric storage device shown in FIG. 1. In FIG. 2, a characteristic C1 shows a case where one internal resistance of one of storage elements 102C, 104C and 106C increases. Characteristic C2 shows an inter-terminal voltage of a storage element with a small internal resistance. This state can occur, for example, at a low temperature such as not higher than 0° C. when variations in resistance value become larger. When an internal resistance (not shown) of one storage element is extremely large as compared with those of the other storage elements, a voltage that is generated with a value of a product of the internal resistance of the storage element and the charging current is applied to the storage element in addition to a voltage obtained by voltage division according to an inverse ratio of the capacity. Since the voltage concentrates especially when the charging current is large, peak voltage VP as shown in FIG. 2 is generated, exceeding reference voltage VR, and with the passage of time tcc, as charging by constant current ICC is shifted to control by a constant current, charging current IC gradually decreases, and peak voltage VP also gradually decreases and ultimately converges to prescribed magnitude VC.

In the embodiment 1, valuable reference voltage source 124 is previously set slightly higher at the initial stage of charging in consideration of peak voltage VP, and when charging current IC falls below current ICR as a prescribed threshold, the magnitude of valuable reference voltage source 124 is adjusted to be low through charging current detection unit 120 and control signal 120B. As thus described, when the magnitude of valuable reference voltage source 124 is adjusted based on the magnitude of charging current IC, it is possible to efficiently charge storage elements 102C, 104C and 106C while suppressing an influence of transitionally generated voltage concentration as much as possible.

It is to be noted that valuable reference voltage source 124 during charging can be set over resistance voltages (successively applicable voltages) of storage elements 102C, 104C and 106C. Such a setting may be made in consideration of the relation between the time at which valuable reference voltage source 124 transitionally exceeds the resistance voltage during charging and the lives of the electric double-layer capacitors constituting storage elements 102C, 104C and 106C.

It is to be noted that in the embodiment 1, the case of serially connecting three storage elements 102C, 104C and 106C was taken as an example for the sake of description. However, serial connection of storage elements in any number exerts a similar effect. Further, the plurality of serially connected elements which are connected in parallel exerts an identical effect. Further, the control unit, the voltage comparison unit and the variable reference voltage source may be constituted of a microcomputer or the like, and in that case, the variable reference voltage source can be set by software.

Embodiment 2

Figure 3:
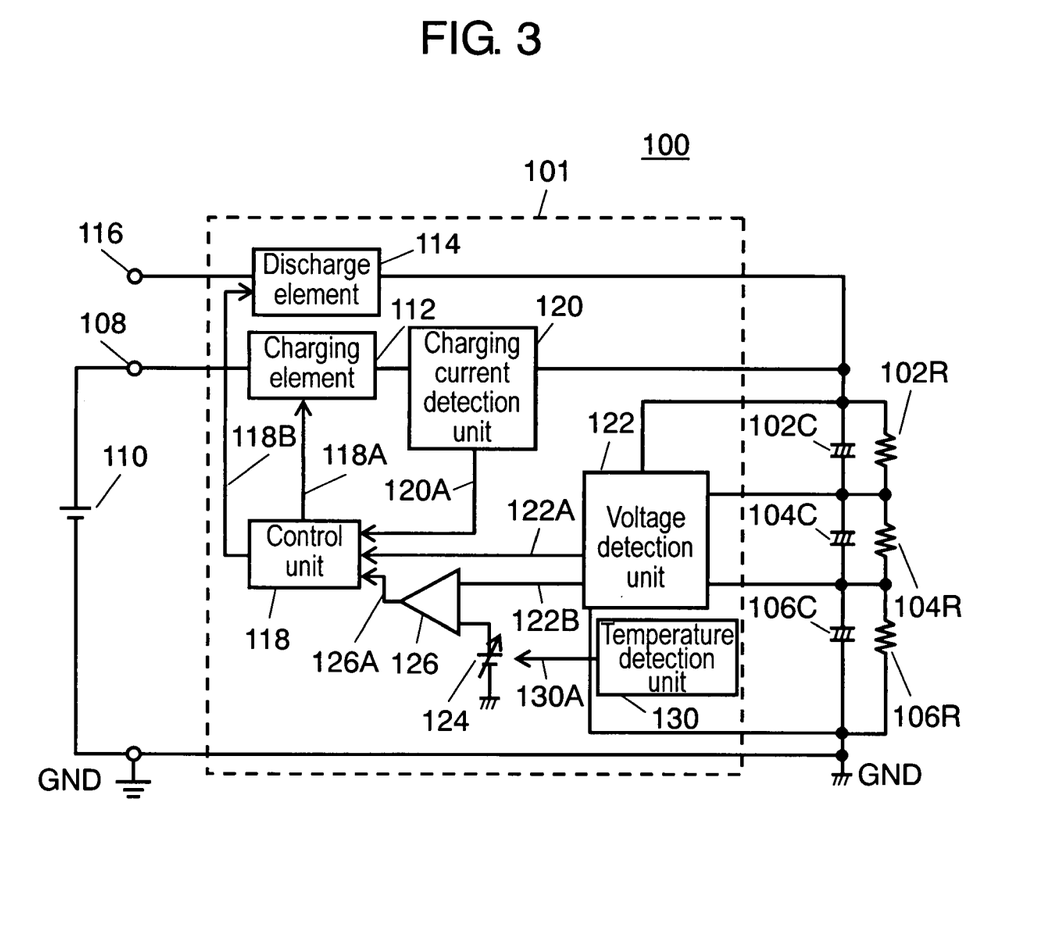
FIG. 3 is a constitutional view of an electric storage device according to an embodiment 2 of the present invention.

FIG. 3 is a constitutional view of a storage element according to an embodiment 2. This is different from the embodiment 1 in that valuable reference voltage source 124 is adjusted based on temperatures of storage elements 102C, 104C and 106C themselves or ambient temperatures of a position where these storage elements are placed.

Namely, temperature detection unit 130 is provided for detecting the temperature of at least one of storage elements 102C, 104C and 106C and the ambient temperatures of these storage elements. Detection signal 130A is generated based on a temperature detected by temperature detection unit 130, and valuable reference voltage source 124 is adjusted based on detection signal 130A.

At a low temperature such as not higher than 0° C., the internal resistances of storage elements 102C, 104C and 106C made up of the electric double-layer capacitors increase and variations in internal resistance become larger. In such a case, when the internal resistance of one of storage elements 102C, 104C and 106C becomes extremely larger than those of the other internal resistances, peak voltage VP is generated since the voltage concentrates on that storage element, as shown in FIG. 2.

It is to be noted that at a low temperature, the resistance voltages (successively applicable voltages) of the electric double-layer capacitors constituting storage elements 102C, 104C and 106C are not significantly affected by the lives of the electric double-layer capacitors so long as being in a range of a certain magnitude. This can make valuable reference voltage source 124 larger regardless of the magnitude of the charging current with respect to the storage elements. In addition, how much valuable reference voltage source 124 is made larger may be determined in consideration of the relation between the temperature in an atmosphere where the storage elements are used and the lives of the electric double-layer capacitors.

Embodiment 3

Figure 4:
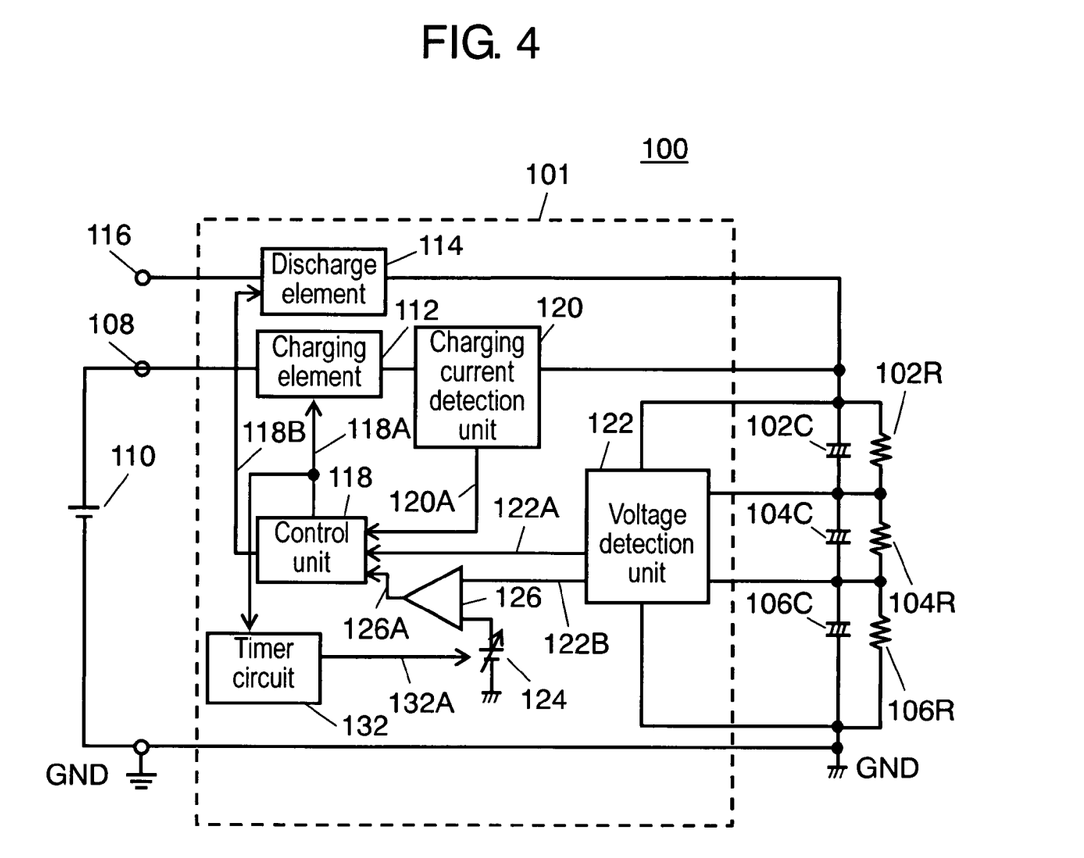
FIG. 4 is a constitutional view of an electric storage device according to an embodiment 3 of the present invention.

FIG. 4 is a constitutional view of an electric storage device according to an embodiment 3. This is different from the embodiment 1 in that timer circuit 132 is provided in charging/discharging limiting circuit 101, and the magnitude of valuable reference voltage source 124 is adjusted by control signal 132A generated based on the time measured by timer circuit 132.

Namely, as seen from the time chart shown in FIG. 2, it is during period tcc when charging is performed by constant current ICC that peak voltage VP is generated in storage elements 102C, 104C and 106C, and when charging proceeds and is shifted to constant voltage control, peak voltage VP is converged due to a decrease in constant current. The time from the start of charging to the completion thereof by constant current ICC can be calculated using charging current IC and the capacitances of the storage elements.

Therefore, the time from the start of charging is measured by timer circuit 132 and after the time has reached the calculated time to the completion of charging, the magnitude of valuable reference voltage source 124 is adjusted to be lower, so that the problem of peak voltage VP limiting charging current IC is eliminated and the storage elements can be smoothly charged.

Embodiment 4

Figure 5:
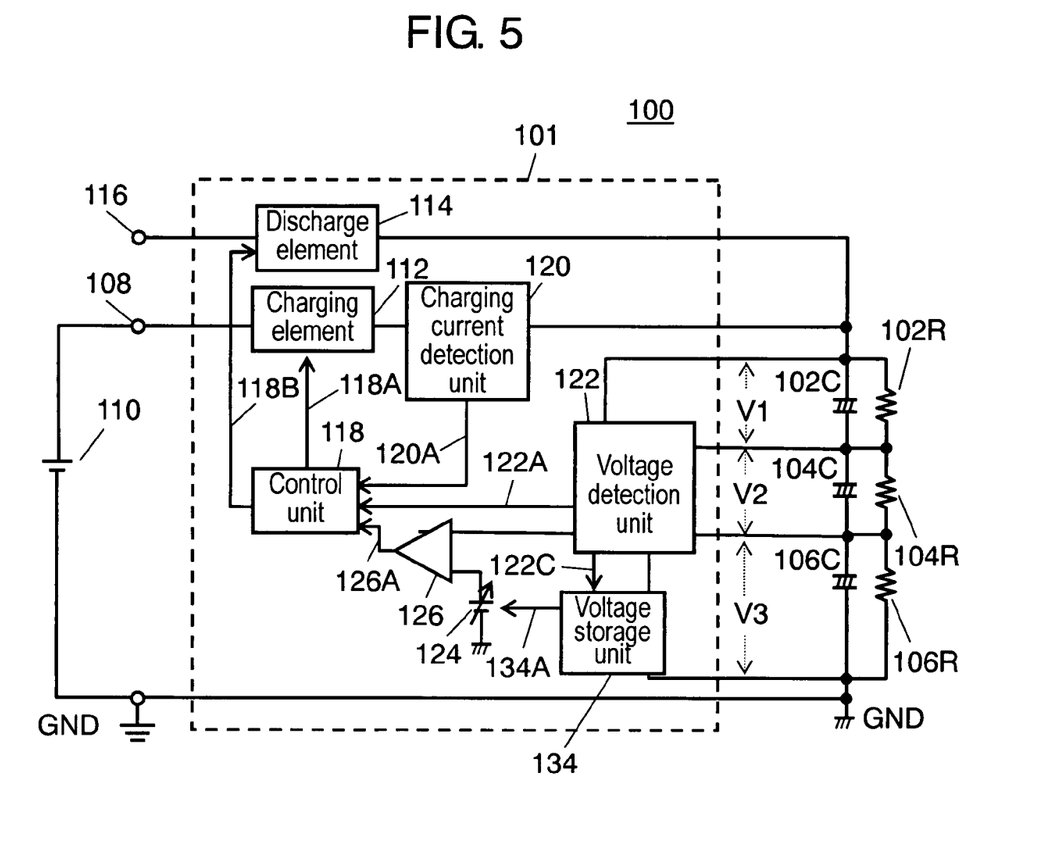
FIG. 5 is a constitutional view of an electric storage device according to an embodiment 4 of the present invention.

FIG. 5 is a constitutional view of an electric storage device according to an embodiment 4. This is different from the embodiment 1 in that voltage storage unit 134 is provided which stores differences of the inter-terminal voltages which are stored in storage elements 102C, 104C and 106C before and after the halt of charging, e.g. (V1–V2), (V2–V3), (V3–V1), to adjust valuable reference voltage source 124 through control signal 134A based on the differences of the voltages of the storage elements before and after the halt of charging.

Namely, charging is temporarily halted during constant-current charging, and the difference in storage element voltage before and after the halt of charging is stored in voltage storage unit 134, to calculate peak voltage VP that is generated with a value of a product of the internal resistance of each of the storage elements and charging current IC. Based upon this, valuable reference voltage source 124 during constant-current charging is adjusted to increase so that the problem of charging current IC being limited due to generation of peak voltage VP is eliminated and the storage elements can be smoothly charged.

Embodiment 5

Figure 6:
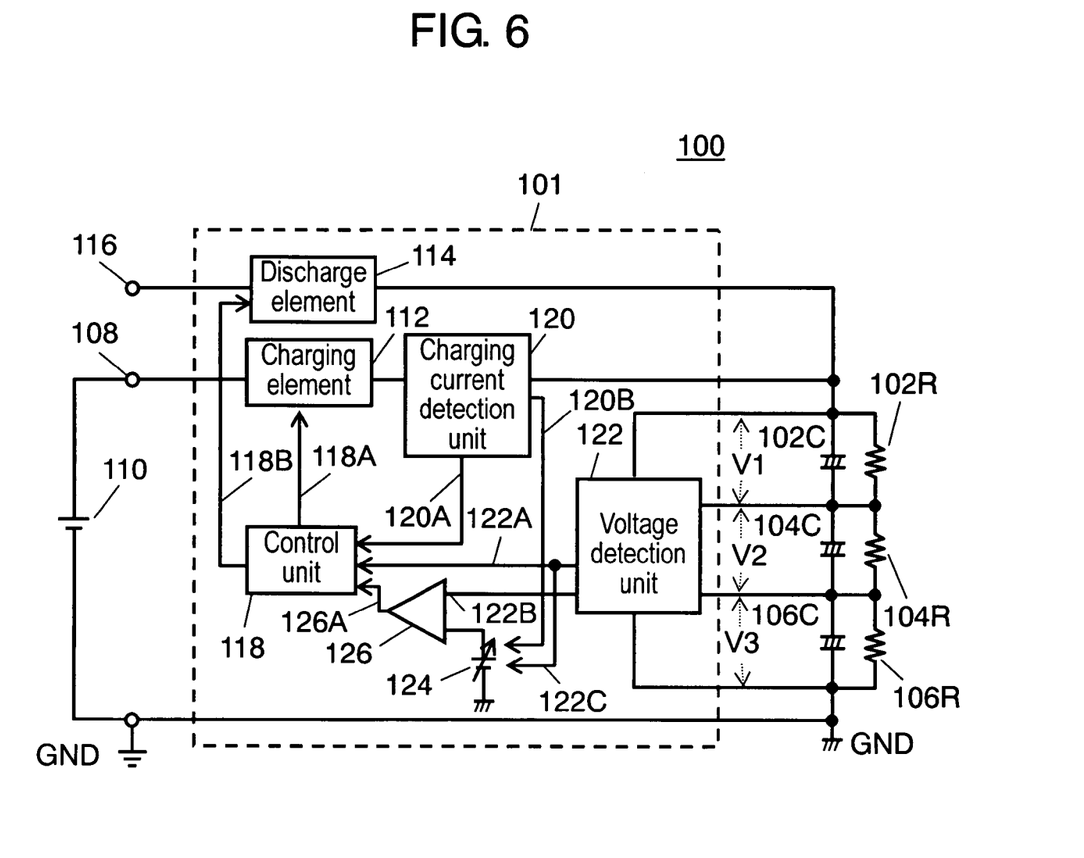
FIG. 6 is a constitutional view of an electric storage device according to an embodiment 5 of the present invention.

FIG. 6 is a constitutional view of an electric storage device according to an embodiment 5. This is different from the embodiment 1 in that a voltage, detected by voltage detection unit 122 that detects inter-terminal voltages V1, V2 and V3 of storage elements 102C, 104C and 106C, is adjusted to the magnitude of valuable reference voltage source 124 through detection signal 122C. Namely, valuable reference voltage source 124 is adjusted by two control channel: first control through charging current detection unit 120 and control signal 120B; and second control through voltage detection unit 122 and detection signal 122C.

In the embodiment 1, charging current detection unit 120 adjusts valuable reference voltage source 124 based on charging current IC. In such a configuration, there may occur a problem in that, when a noise is applied to charging current IC, valuable reference voltage source 124 is adjusted to a wrong magnitude due to malfunction. At this time, charging current IC is limited based on wrong valuable reference voltage source 124. As opposed to this, in the embodiment 5, since the voltages of storage elements 102C, 104C and 106C detected by voltage detection unit 122 are added as one condition for adjustment of valuable reference voltage source 124, the problem of the change in magnitude of valuable reference voltage source 124 under the influence of a noise can be eliminated. Namely, a setting is made such that, when the inter-terminal voltages of storage elements 102C, 104C and 106C do not exceed a prescribed threshold, adjustment of valuable reference voltage source 124 is not executed. This can give redundancy against a noise so that an electric storage device with higher reliability can be provided.

Embodiment 6

Figure 7:
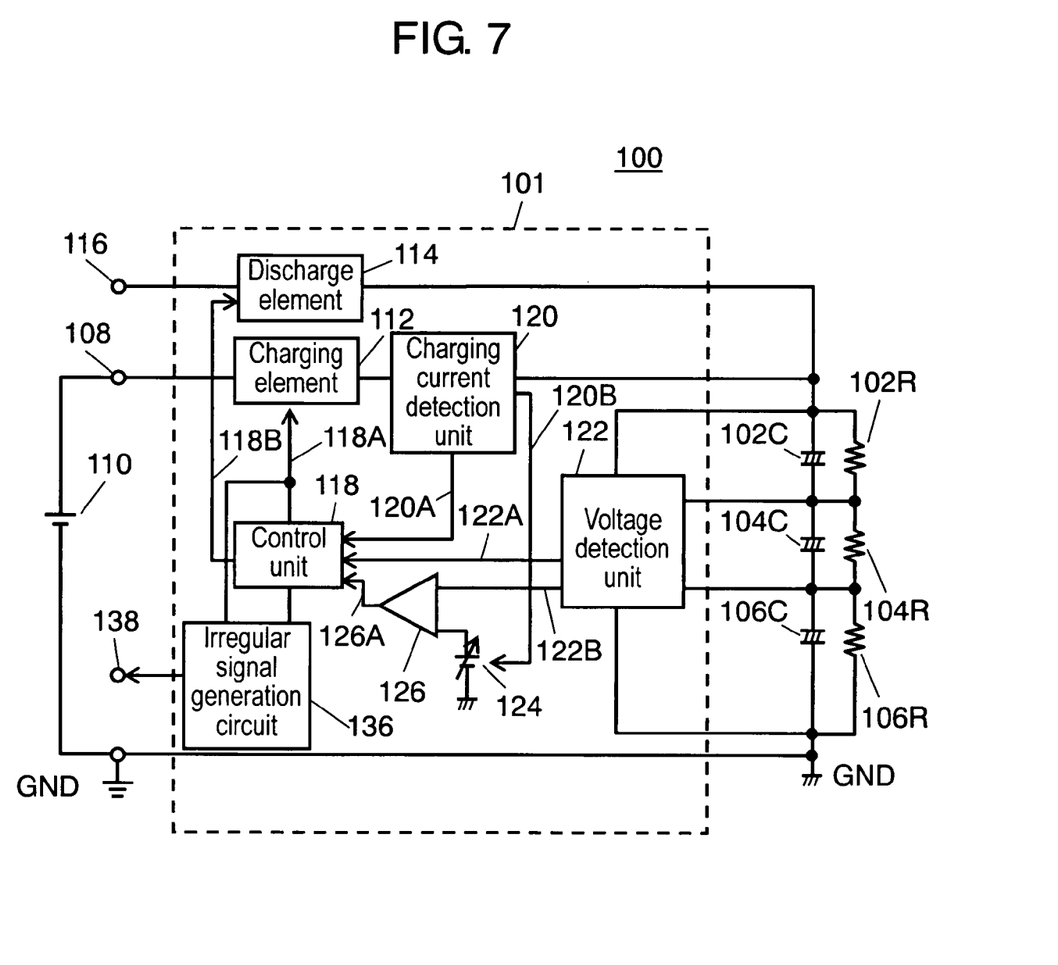
FIG. 7 is a constitutional view of an electric storage device according to an embodiment 6 of the present invention.

FIG. 7 is a constitutional view of an electric storage device according to an embodiment 6. This is different from the embodiment 1 in that, when the voltages of storage elements 102C, 104C and 106C exceed a set upper limit voltage, irregular signal generation circuit 136 which outputs an irregular signal is provided. With such a configuration, when certain irregularity occurs in the electric storage device and an overvoltage is applied to storage elements 102C, 104C and 106C, charging current IC is halted or limited to prevent deterioration of the these storage elements from occurring. In conjunction with this, an irregular signal is outputted to irregular signal terminal 138 to notify the user that the electric storage device is in an irregular state.

It is to be noted that the characteristic of the embodiment 6 can also be applied to the embodiments 2 to 5, and a similar effect is exerted.

Embodiment 7

Figure 8:
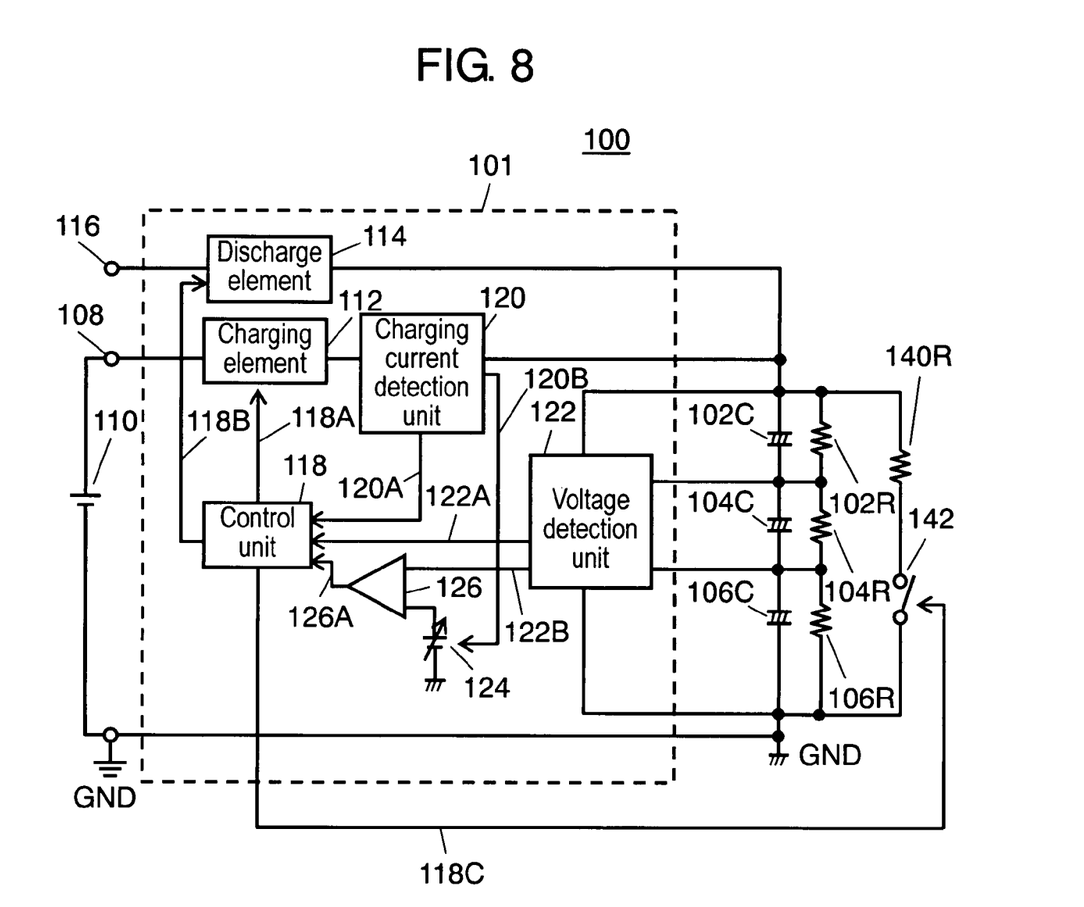
FIG. 8 is a constitutional view of an electric storage device according to an embodiment 7 of the present invention.

FIG. 8 is a constitutional view of an electric storage device according to an embodiment 7. This is different from the embodiment 1 in that a discharge circuit unit made up of discharge resistance 140R and discharge switch 142 is provided. Namely, when a voltage applied to the electric double-layer capacitors as storage elements 102C, 104C and 106C are about to exceed a prescribed upper limit voltage, discharge switch 142 is closed to discharge a charge stacked in the whole of the electric double-layer capacitors through discharge resistance 140R in order to prevent deterioration of the electric double-layer capacitors from occurring. With this configuration, electric safety of the electric storage devices can be secured, and the lives thereof can further be extended.

It is to be noted that the configuration according to the embodiment 7 can also be applied to the configurations of the embodiments 2 to 5, and a similar effect is exerted.

INDUSTRIAL APPLICABILITY

The electric storage device according to the present invention can eliminate an influence of variations in internal resistance of the storage elements and concentration of a voltage which is transitionally generated by a charging current during charging to the storage element. Further, the storage element is smoothly charged, and an overvoltage of each of the storage elements is reliably detected so that deterioration of the storage element can be prevented. Therefore, the electric storage device according to the present invention is useful for a backup power source for emergency that requires rapid charging by a large current, and hence the industrial applicability thereof is high.

The invention claimed is:
1. An electric storage device, comprising:
an input terminal;
a direct current power source connected to the input terminal;

a charge element connected to the input terminal and limiting a direct current from the direct current power source;

a charging current detection unit connected to the charge element and detecting the charging current;

a storage element connected to the charging current detection unit;

a discharge element connected to the storage element;

an output terminal connected to the discharge element;

a voltage detection unit detecting a voltage to be applied to the storage element;

a control unit connected to the voltage detection unit and controlling the charge element and the discharge element;

a voltage comparison unit connected to the voltage detection unit and the control unit; and a variable reference voltage source connected to the voltage comparison unit, and its magnitude is adjusted therefore, wherein, when an inter-terminal voltage of the storage element exceeds the variable reference voltage source, an overvoltage of the storage element is detected and the charge element is controlled through the control unit to halt the charging current or to limit a magnitude of the charging current, so as to prevent deterioration of the charge element, and wherein the variable reference voltage source is adjusted based on a current value detected by the charging current detection unit.

2. The electric storage device according to claim 1, wherein the variable reference voltage source is adjusted based on detection signals detected by the charging current detection unit and the voltage detection unit.

3. The electric storage device according to claim 1, further comprising:

an irregular signal generation circuit which outputs an irregular signal when a charging voltage, that is charged by the storage element, exceeds a prescribed inter-terminal voltage of the storage element.

4. The electric storage device according to claim 1, further comprising:

a discharge circuit unit discharging a charge which has stored in the storage element when a voltage of the storage element exceeds a prescribed inter-terminal voltage, wherein the storage element is constituted with an electric double layered capacitor.

5. An electric storage device, comprising:

an input terminal;

a direct current power source connected to the input terminal;

a charge element connected to the input terminal and limiting a direct current from the direct current power source;

a charging current detection unit connected to the charge element and detecting the charging current;

a storage element connected to the charging current detection unit;

a discharge element connected to the storage element;

an output terminal connected to the discharge element;

a voltage detection unit detecting a voltage to be applied to the storage element;

a control unit connected to the voltage detection unit and controlling the charge element and the discharge element;

a voltage comparison unit connected to the voltage detection unit and the control unit; and a variable reference voltage source connected to the voltage comparison unit, and its magnitude is adjusted therefore, wherein, when an inter-terminal voltage of the storage element exceeds the variable reference voltage source, an overvoltage of the storage element is detected and the charge element is controlled through the control unit to halt the charging current or to limit a magnitude of the charging current, so as to prevent deterioration of the charge element, and wherein the variable reference voltage source is adjusted based on a temperature detected by a temperature detection unit which detects a temperature of the storage element itself or an ambient temperature of a position where the storage element is placed.

6. The electric storage device according to claim 5, further comprising:

an irregular signal generation circuit which outputs an irregular signal when a charging voltage, that is charged by the storage element, exceeds a prescribed inter-terminal voltage of the storage element.

7. The electric storage device according to claim 5, further comprising:

a discharge circuit unit discharging a charge which has stored in the storage element when a voltage of the storage element exceeds a prescribed inter-terminal voltage, wherein the storage element is constituted with an electric double layered capacitor.

8. An electric storage device, comprising:

an input terminal;

a direct current power source connected to the input terminal;

a charge element connected to the input terminal and limiting a direct current from the direct current power source;

a charging current detection unit connected to the charge element and detecting the charging current;

a storage element connected to the charging current detection unit;

a discharge element connected to the storage element;

an output terminal connected to the discharge element;

a voltage detection unit detecting a voltage to be applied to the storage element;

a control unit connected to the voltage detection unit and controlling the charge element and the discharge element;

a voltage comparison unit connected to the voltage detection unit and the control unit; and a variable reference voltage source connected to the voltage comparison unit, and its magnitude is adjusted therefore, wherein, when an inter-terminal voltage of the storage element exceeds the variable reference voltage source, an overvoltage of the storage element is detected and the charge element is controlled through the control unit to halt the charging current or to limit a magnitude of the charging current, so as to prevent deterioration of the charge element, and wherein the variable reference voltage source is adjusted based on a time measured by a timer circuit connected to the control unit.

9. The electric storage device according to claim 8, further comprising:

an irregular signal generation circuit which outputs an irregular signal when a charging voltage, that is charged by the storage element, exceeds a prescribed inter-terminal voltage of the storage element.

10. The electric storage device according to claim 8, further comprising:
a discharge circuit unit discharging a charge which has stored in the storage element when a voltage of the storage element exceeds a prescribed inter-terminal voltage,
wherein the storage element is constituted with an electric double layered capacitor.

11. An electric storage device, comprising:
an input terminal;
a direct current power source connected to the input terminal;
a charge element connected to the input terminal and limiting a direct current from the direct current power source;
a charging current detection unit connected to the charge element and detecting the charging current;
a storage element connected to the charging current detection unit;
a discharge element connected to the storage element;
an output terminal connected to the discharge element;
a voltage detection unit detecting a voltage to be applied to the storage element;
a control unit connected to the voltage detection unit and controlling the charge element and the discharge element;
a voltage comparison unit connected to the voltage detection unit and the control unit; and
a variable reference voltage source connected to the voltage comparison unit, and its magnitude is adjusted therefore,
wherein, when an inter-terminal voltage of the storage element exceeds the variable reference voltage source, an overvoltage of the storage element is detected and the charge element is controlled through the control unit to halt the charging current or to limit a magnitude of the charging current, so as to prevent deterioration of the charge element, and
wherein a charging of the storage element is temporarily halted during the charging, and the variable reference voltage source is adjusted based on a difference in inter-terminal voltage of the storage element before and after the halt of the charging.

12. The electric storage device according to claim 11, further comprising:
an irregular signal generation circuit which outputs an irregular signal when a charging voltage, that is charged by the storage element, exceeds a prescribed inter-terminal voltage of the storage element.

13. The electric storage device according to claim 11, further comprising:
a discharge circuit unit discharging a charge which has stored in the storage element when a voltage of the storage element exceeds a prescribed inter-terminal voltage,
wherein the storage element is constituted with an electric double layered capacitor.

* * * * *